United States Patent
Erickson

(10) Patent No.: US 8,679,285 B2
(45) Date of Patent: Mar. 25, 2014

(54) BREATHABLE FABRIC LAMINATION

(75) Inventor: Paul R Erickson, New Boston, NH (US)

(73) Assignee: Velero Industries B.V., Wallemstad, Curacao ( * ) Notice: Subject to any disclaimer, the term of this patent is extended or adjusted under 35 U.S.C. 154(b) by 956 days.

(21) Appl. No.: 12/750,887

(22) Filed: Mar. 31, 2010

(65) Prior Publication Data
US 2010/0247846 A1    Sep. 30, 2010

Related U.S. Application Data

(60) Provisional application No. 61/165,138, filed on Mar. 31, 2009.

(51) Int. Cl.
| | |
|---|---|
| B32B 7/14 | (2006.01) |
| B65C 9/25 | (2006.01) |
| C09J 5/00 | (2006.01) |
| B29C 65/00 | (2006.01) |
| B32B 37/00 | (2006.01) |
| B32B 3/06 | (2006.01) |
| B32B 27/14 | (2006.01) |

(52) U.S. Cl.
USPC ............. 156/291; 156/324; 428/99; 428/198

(58) Field of Classification Search
USPC ............ 156/60, 72, 91, 153, 154, 290, 291, 156/322, 324; 428/98, 99, 100, 195.1, 198, 428/221
See application file for complete search history.

(56) References Cited

U.S. PATENT DOCUMENTS

| | | |
|---|---|---|
| 3,705,065 A | 12/1972 | Stumpf |
| 3,822,162 A | 7/1974 | Stumpf |
| 5,139,479 A | 8/1992 | Peters |
| 5,256,231 A | 10/1993 | Gorman et al. |
| 5,326,612 A | 7/1994 | Goulait |
| 5,330,817 A | 7/1994 | Arnott et al. |
| 5,547,531 A | 8/1996 | Allen et al. |
| 5,554,239 A | 9/1996 | Datta et al. |

(Continued)

FOREIGN PATENT DOCUMENTS

| | | |
|---|---|---|
| EP | 604731 A1 | 7/1994 |
| EP | 1 052 319 | 11/2000 |

(Continued)

OTHER PUBLICATIONS

International Search Report and Written Opinion; May 9, 2012; World Intellectual Property Organization (WIPO) (International Bureau of); PCT/US2011/060565; 10 pages.

(Continued)

Primary Examiner — Philip Tucker
Assistant Examiner — Brian R Slawski
(74) Attorney, Agent, or Firm — Fish & Richardson P.C.

(57) ABSTRACT

A breathable fabric laminate is formed from fabrics of differing properties, by selecting respective faces of each of two fibrous fabrics to be adhesively joined across the selected faces, raising surface fibers of at least one of the selected faces by brushing or napping the surface fibers, applying a pattern of adhesive to at least one of the selected faces, the pattern including areas of adhesive and adhesive-free areas, and then joining the selected faces to form a fabric laminate. Napping or brushing the back sides of the fabrics prior to lamination creates a spacing layer that can increase air permeability and overall laminate thickness.

19 Claims, 5 Drawing Sheets

(56) References Cited

U.S. PATENT DOCUMENTS

| | | | |
|---|---|---|---|
| 5,615,460 | A | 4/1997 | Weirich et al. |
| 5,738,937 | A | 4/1998 | Baychar |
| 5,763,041 | A | 6/1998 | Leak et al. |
| 5,804,011 | A * | 9/1998 | Dutta et al. .................. 156/160 |
| 5,817,391 | A | 10/1998 | Rock et al. |
| 6,165,585 | A * | 12/2000 | Trokhan ...................... 428/101 |
| 6,329,016 | B1 | 12/2001 | Shepard et al. |
| 6,494,207 | B1 | 12/2002 | Kwok |
| 6,582,382 | B2 | 6/2003 | Domanski et al. |
| 6,776,014 | B1 | 8/2004 | Laycock et al. |
| 6,869,659 | B2 | 3/2005 | Shepard et al. |
| 6,918,236 | B2 | 7/2005 | Springs |
| 6,929,617 | B2 | 8/2005 | McCormick et al. |
| 6,981,341 | B2 | 1/2006 | Baychar |
| 7,282,251 | B2 | 10/2007 | Provost et al. |
| 7,303,808 | B2 | 12/2007 | Taneichi et al. |
| 2002/0056502 | A1 | 5/2002 | Bordes |
| 2002/0136846 | A1 | 9/2002 | Prevost |
| 2004/0116022 | A1* | 6/2004 | Langley et al. ............... 442/289 |
| 2004/0167456 | A1 | 8/2004 | Kingsford et al. |
| 2005/0075028 | A1* | 4/2005 | Rock et al. ................... 442/318 |
| 2005/0196583 | A1 | 9/2005 | Provost et al. |
| 2005/0208260 | A1 | 9/2005 | Baldauf |
| 2005/0239363 | A1* | 10/2005 | Martin .......................... 442/328 |
| 2008/0072629 | A1 | 3/2008 | Gehring |
| 2008/0082076 | A1 | 4/2008 | Kingsford et al. |
| 2008/0305297 | A1 | 12/2008 | Barker et al. |
| 2009/0203280 | A9 | 8/2009 | Provost et al. |
| 2010/0247846 | A1 | 9/2010 | Erickson |

FOREIGN PATENT DOCUMENTS

| | | | |
|---|---|---|---|
| EP | 1444093 A1 | 8/2004 | |
| EP | 1 561 441 | 8/2005 | |
| EP | 1638500 A1 | 3/2006 | |
| FR | 2 801 614 | 6/2001 | |
| WO | WO94/10946 | 5/1994 | |
| WO | WO 01/34080 A2 * | 5/2001 | ............. A61F 13/15 |
| WO | WO2006107844 A9 | 12/2007 | |

OTHER PUBLICATIONS

Bruer et al; Three-Dimensionally Knit Spacer Fabrics: A Review of Production Techniques and Applications; Summer 2005; Journal of Textile and Apparel; United States.

International Search Report and Written Opinion in PCT/US2010,029300 mailed May 31, 2010 (12 pages).

Maliwatt "Stitch-Bonding Machines for Nonwoven-Processing" Brochure by Karl Mayer, published 2007 (8 pages).

* cited by examiner

BREATHABLE FABRIC LAMINATION

TECHNICAL FIELD

This invention relates to forming breathable fabric laminations from multiple fabric layers, and to such laminations.

BACKGROUND

Hook engageable loop fabrics are often used in medical and sports markets for applications such as straps, which may support medical devices on a patient, or in braces that may be wrapped around body parts, such as elbows or knees as a support. In these types of applications it is preferred that the straps be adjustable to conform to varying patient anatomies. Hook-engageable loop fabrics are often preferred over other mechanical fastening systems, such as tape, metal hooks or pin fastening systems, due to their ease of use.

The hook-engageable loop fabrics in these applications are normally laminated to foams or Neoprene polychloroprene to add comfort, stretch, or compress-ability. If reinforcing is needed in certain areas to immobilize fingers or joints, plastic or metal supports are sewn into the brace. In many cases an additional fabric is laminated to the opposite side of the hook engage-able fabric to improve comfort in cases where this laminate is to be used in direct skin contact. Many of these foam and Neoprene polychloroprene composite fabrics have poor air permeability that does not allow sweat and heat to move quickly away from the skin. In prolonged skin contact situations, bacteria can develop in this wet environment, resulting in odor, possible skin infections or dermatitis. In some products, the fabric used on the inside of the laminate in contact with the skin is an inexpensive tricot knit fabric.

In some laminates, such as Breath-O-Prene®, a hook-engageable fabric is laminated to a Neoprene polychloroprene on one side, and an inexpensive tricot fabric on the other. The Neoprene polychloroprene in this case is perforated to promote air penetration and moisture movement. Silver-Tec® brand laminate is similar to a Neoprene polychloroprene laminate and contains silver to provide anti-microbial properties. Despite the perforations in these products, air permeation is limited.

In some other cases an open, net-like fabric is provided, as in the Powerstretch-Rx® product available from Polartec and used on some Futuro® brand straps made by Biersdorf Inc. of Wilton, Conn., USA. This fabric is a non-hook-engageable knit spacer fabric with top and bottom fabric layers and yarns knit between the layers to space them apart. It is said to have moisture-releasing properties. Other brace straps, like the Futuro® Infinity precision-fit braces, advertise enhanced breathability and anti-microbial support. These laminates are foam laminates with a soft interior skin contact fabric laminated to a foam core, then laminated to an outer layer of hook-engageable loop material with holes on one side of the laminate that allow for some air and moisture transport.

SUMMARY

Some aspects of the invention feature forming a breathable fabric laminate from fabrics of differing properties, by first raising surface fibers of a face of at least one of the fabrics by brushing or napping the surface fibers, or by other means, and then adhesively bonding that face with the other fabric to form the laminate. Raising the surface fibers on at least one of the faces to be bonded, prior to bonding, helps to increase the resulting thickness of the laminate by increasing a thickness of a spacing between the denser regions of the fabrics, formed by raised surface fibers and air and, in some regions, adhesive.

One aspect features selecting respective faces of each of two fibrous fabrics to be adhesively joined across the selected faces, raising surface fibers of at least one of the selected faces by brushing or napping the surface fibers, applying a pattern of adhesive to at least one of the selected faces (the pattern including areas of adhesive and adhesive-free areas), and then joining the selected faces to form a fabric laminate.

In some cases, raising the surface fibers involves passing the fabric against a series of wire covered rolls.

In some embodiments, raising the surface fibers involves increasing the fabric thickness by at least 50 percent, preferably at least 60 percent, more preferably at least 70 percent.

The formed laminate may be spooled for transport or later processing.

In some examples, applying the pattern of adhesive involves coating no more than about 70 percent of the selected face to which the adhesive is applied.

The adhesive may be applied to only one of the selected faces, in some cases as a pattern of unconnected adhesive regions. For example, the adhesive regions may be applied by a gravure roller that defines cavities that hold respective amounts of adhesive that form individual adhesive regions. The cavities may each having a depth of between about 0.18 and 0.25 millimeter, for example.

In some cases, the adhesive regions each consist of a single adhesive dot. In some cases, the adhesive regions are in the form of parallel lines, or parallel lines of dots, of adhesive.

In some embodiments, applying the adhesive involves training one of the fabrics about a compliant surface of a pressure roller, and engaging the selective face of the trained fabric with a gravure roller carrying the adhesive. For example, joining the selected faces may include carrying the trained fabric about the pressure roller into a lamination nip defined between the pressure roller and a laminating roller, while training the other of the two fabrics about the laminating roller and through the lamination nip.

In some embodiments the adhesive is a hot melt adhesive, such as a polyamide or co-polyamide.

In some configurations, at least one of the selected faces is heated prior to joining them. The heated face may be free of adhesive until the selected faces are joined.

In some cases, joining the selected faces involves passing the two fibrous fabrics through a nip between counter-rotating rollers, in which nip the two fabrics are subjected to laminating pressure.

In some embodiments, one of the two fibrous fabrics is an engageable fabric, such as a knit fabric, that carries hook-engageable fiber loops that remain exposed on an outer surface of the fabric laminate, and raising surface fibers of the engageable fabric involves brushing or napping a side of the engageable fabric opposite the fiber loops. The engageable fabric may be a warp or circular knit fabric, for example, and may include hydrophilic yarns (or formed primarily of hydrophilic yarns).

In some embodiments, the other of the two fibrous fabrics includes microdenier (or near-microdenier) yarns and forms an exposed surface of the laminate opposite the fiber loops. This fabric may be a circular knit fabric, for example. In some cases, this fabric is formed primarily of microdenier yarns, which may be advantageously hydrophobic and may be of non-circular or hollow cross-section.

In some examples for producing stretchable laminates, one of the fabrics is a resiliently stretchable fabric, such as one containing elastane, rubber or latex fibers or yarns. In some cases, both of the fabrics contain elastomeric fibers or yarns.

Another aspect of the invention features a flexible, breathable fabric laminate that includes a first fabric layer in the form of a knit fabric that carries hook-engageable fiber loops exposed on an outer surface of the fabric laminate, and a second fabric layer bonded directly to the first fabric layer by an adhesive that covers no more than about 70 percent of either fabric layer, leaving adhesive-free areas of the laminate. The first fabric layer is preferably formed primarily of hydrophilic yarns, and the second fabric layer is preferably formed primarily of hydrophobic, microdenier yarns. In the adhesive-free areas of the laminate, the first and second fabric layers are spaced from each other by a spacing layer of air and raised fabric fibers. The spacing layer preferably has a visual thickness of at least about 20 percent of an overall visual thickness of the laminate, as measured from oppositely surfaces of the first and second fabric layers and not including extending fibers.

In some embodiments the laminate, as formed, has a basis weight of less than about 16 osy (540 gsm), and a break strength of at least 75 lbf (333 N).

In some cases the laminate, as formed, has an air permeability measured in accordance with ASTM D737-04, of at least 60 cfm per square foot (18 meters/min), preferably at least 80 cfm per square foot (24 meters/min), more preferably at least 100 cfm per square foot (30 meters/min).

For some applications the overall visual thickness of the laminate is preferred to be less than about 0.05 inch (1.3 mm).

The overall thickness of the laminate, measured in accordance with ASTM D1777 Section 7, Volume 7.01, with a thickness gauge modified for loop textiles with a two-inch (50 mm) diameter foot and a contact force of 31+/−3 grams, is preferably greater than about 0.1 inch (2.5 mm) and less than about 0.25 inch (6 mm).

In some embodiments, at least one of the fabric layers is a resiliently stretchable fabric containing elastane fibers.

The proposed fabrics described herein can provide particularly useful combinations of permeability, hook-engageability, skin-friendliness and cushioning, as well as other properties (such as bacteria resistance) in some configurations. The construction of both fabrics, the adhesive or other bonding means selected, and the lamination technique, can cooperate to provide good air permeability, delamination strength, durability to washing, and biocompatibility. In particular, providing a suitable spacing layer can increase air permeability so as to make the fabric cooler with better ventilation, and to let air reach the skin surface to aid in healing.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
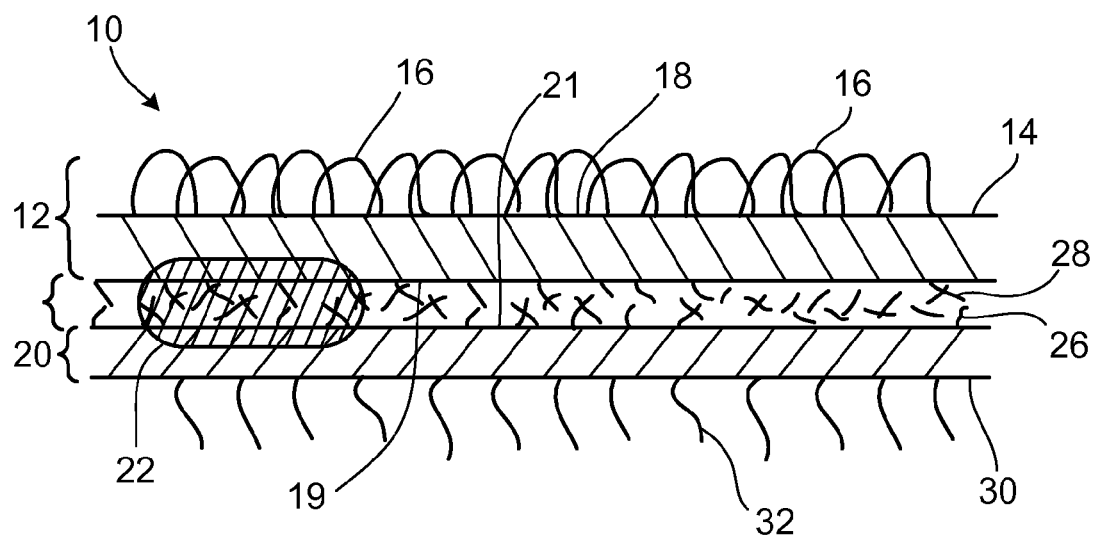
FIG. 1 is a schematic illustration of a fabric laminate material, in side cross-sectional view.

Referring first to FIG. 1, a flexible, breathable fabric laminate 10 includes a first fabric layer 12 in the form of a knit fabric 14 that carries hook-engageable fiber loops 16 exposed on an outer surface 18 of the fabric laminate, and a second fabric layer 20 bonded directly to the first fabric layer 12 by an adhesive 22. The adhesive is arranged in discrete regions that together cover no more than about 70 percent of either fabric layer, leaving adhesive-free areas of the laminate 10. In the adhesive-free areas of the laminate the first 12 and second 20 fabric layers are spaced from each other by a spacing layer 24 that consists of air and raised fabric fibers 26,28 that extend into spacing layer 24 from selected faces 19 and 21 of the first and second fabric layers, respectively. Raised fibers 26,28 help to maintain the thickness of spacing layer 24, to give the laminate significantly more loft and thickness than without the raised fibers.

Figure 2:
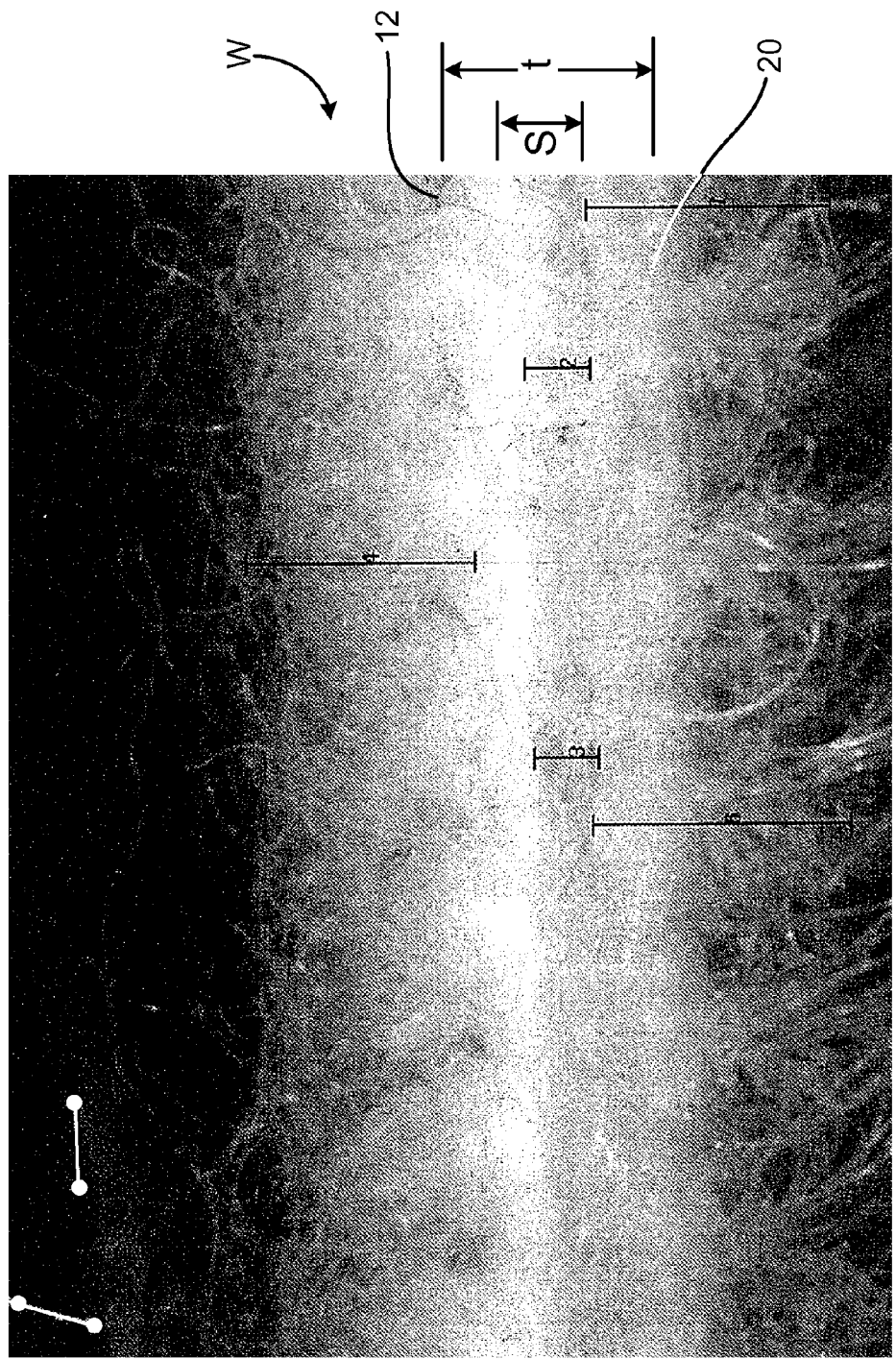
FIGS. 2, 2A and 2B are enlarged photographs of a fabric laminate material, in side view.
Figure 2A:
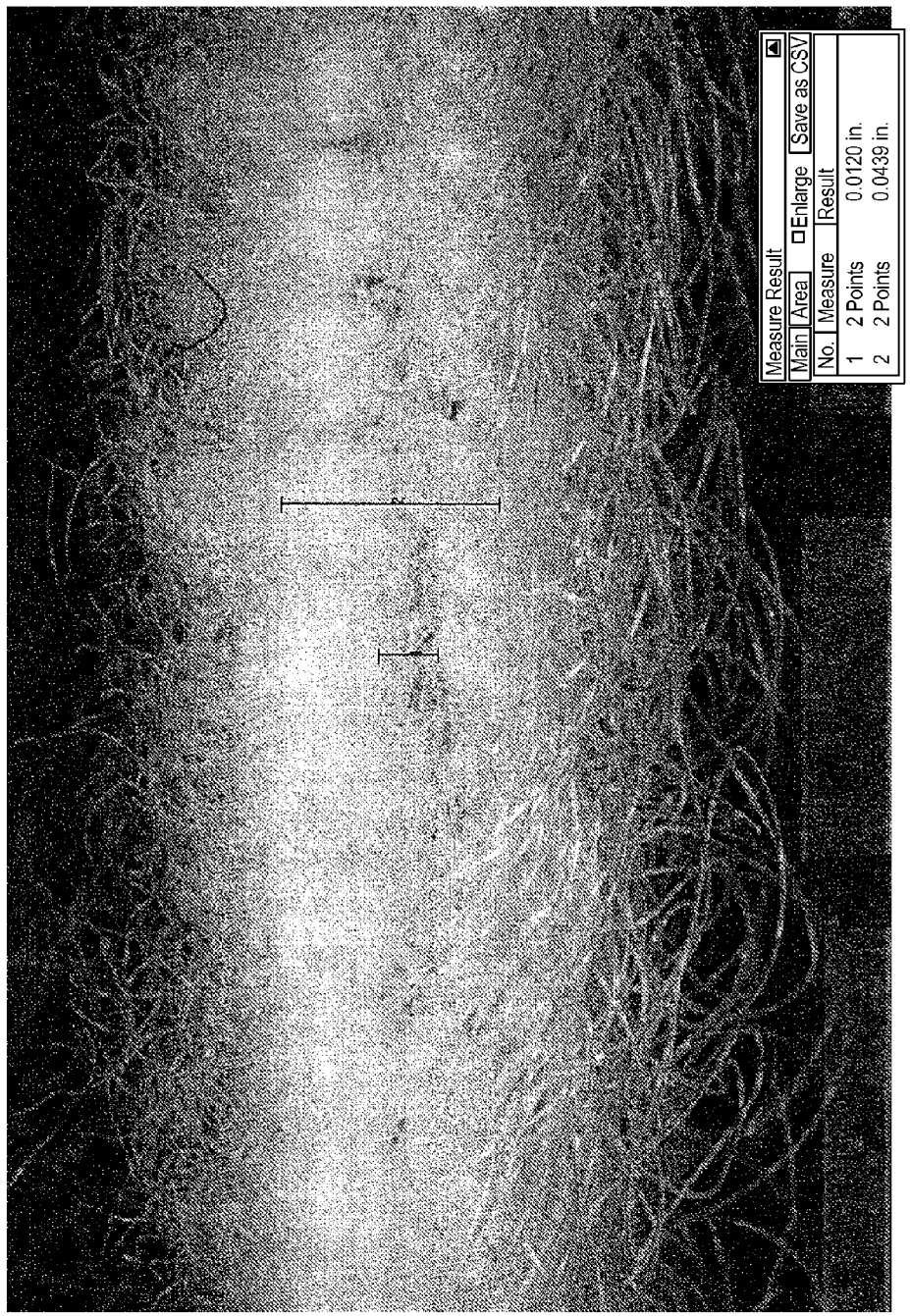
Figure 2B:
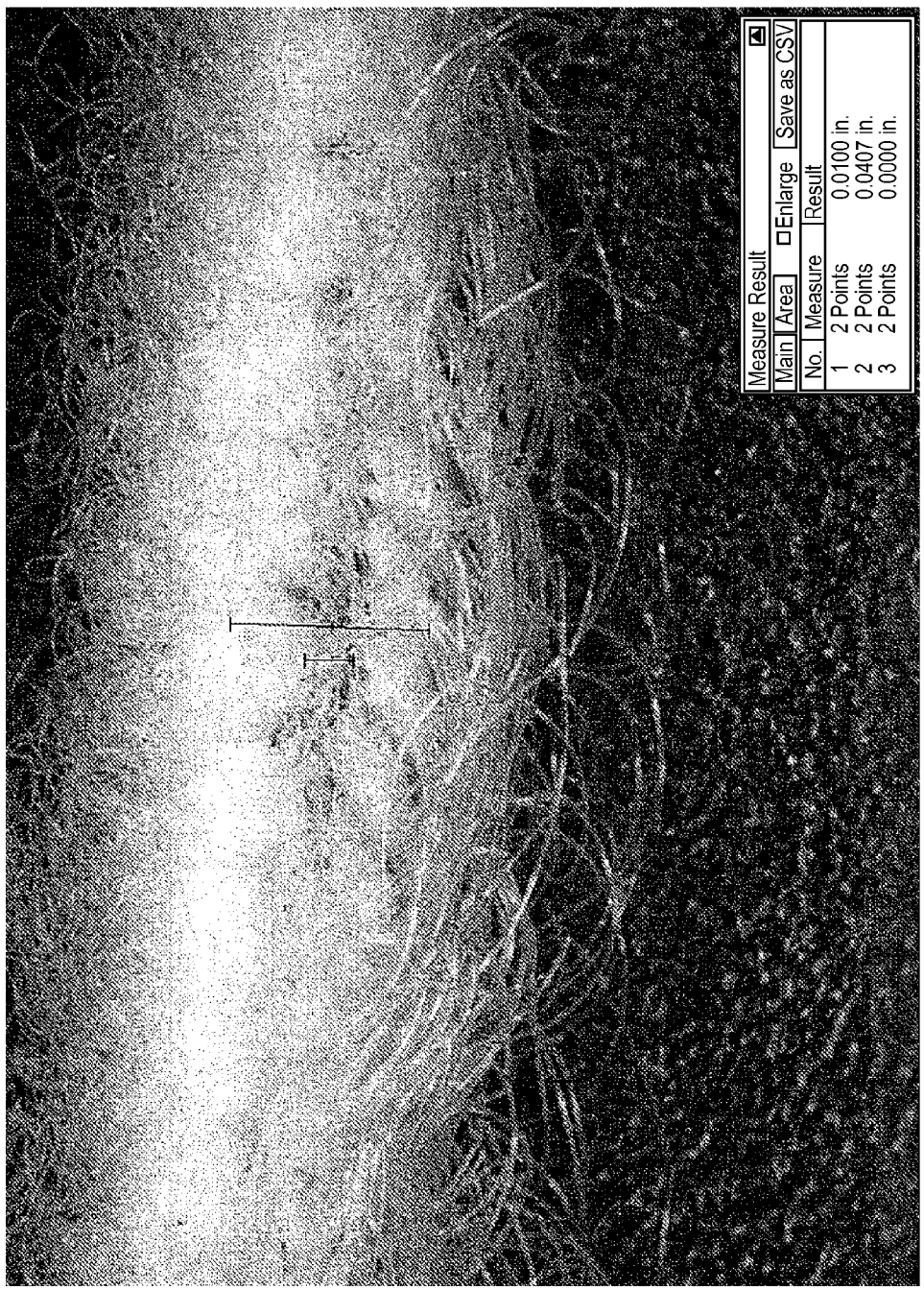

Referring also to FIG. 2, spacing layer 24 has a visual thickness 'S' of at least about 20 percent of an overall visual thickness 't' of the laminate, as measured from oppositely directed surfaces 18 and 30 of the first 12 and second 20 fabric layers and not including extending fibers 32 or loops 16. In the example shown in FIG. 2, spacing layer visual thickness 'S' was about 0.01 inch (0.25 mm), compared to an overall visual thickness 't' of about 0.04 inch (1.0 mm). The overall visual thickness of the laminate is as measured from oppositely surfaces of the first 12 and second 20 fabric layers and not including extending fibers, as illustrated in FIG. 2. Additional views of laminates are shown in FIGS. 2A and 2B, with longer line segments showing the overall visual thickness and shorter line segments showing spacer layer visual thickness. In FIG. 2A the spacer layer visual thickness was measured as 0.0120 inch (0.3 mm) and the overall visual thickness was measured as 0.0439 inch (1.1 mm). In FIG. 2B the spacer layer visual thickness was measured as 0.0100 inch (0.25 mm) and the overall visual thickness was measured as 0.0407 inch (1.0 mm). The visual thicknesses were determined visually with a Keyence VHX-100 digital microscope, from extents representing the most significant changes in fiber densities across the thickness of the material.

Referring back to FIG. 1, first fabric layer 12 is a knit fabric 14 formed primarily of hydrophilic yarns that help pull moisture from inside the laminate, for evaporation from outer surface 18. An example of such a fabric 14 is a NYLON knit loop 3008, available from Velcro USA, Inc. of Manchester, N.H., USA, without binder or back-coating, and has a basis weight of about 5.2 osy (175 gsm). Although schematically illustrated in FIG. 1 as a flat surface, it can be seen from FIG. 2 that the outer surface of the knit fabric has the characteristic undulations of a knit structure from which the loop fibers extend. The fibers forming loops 16 should be of sufficient strength to function through repeated hook cycling, so that they are not easily broken when engaged with a hook, resulting in an objectionably worn (frayed) appearance. For a long-use (i.e., non-disposable) product the fiber denier should be selected to be much coarser than yarns and fibers used in second fabric layer 20. There are numerous yarn and filament combinations possible, but as a practical matter commercial choices are normally limited to products that are currently available in volume. In one example the yarn of first fabric layer 12 is in the 70-denier range with approximately 12 filaments or about 6 denier per filament (dpf). Yarns as large as 280 denier, 14 filament are commercially available, as well as yarns in the 200 denier, 10 filament range. Commercially available yarns as small as approximately 15 denier, 1 filament (i.e., monofilament) can be used, and yarns as small as 20 denier, 5 filament or 4 dpf are possible. Finer denier fibers can be used if the fibers are of sufficiently high tenacity. Fibers of approximately 4 dpf are considered normal tenacity, while fibers of 8 dpf or more are considered high tenacity.

Fibers 28 at the back side of the knit (i.e., the side opposite the loops) are raised by brushing or napping, discussed in more detail below, prior to lamination. The fabric selected for fabric layer 12 in this example is a warp knit fabric, which are generally believed to have better dimensional stability than a circular knit. By laminating a skin friendly circular knit with good air permeability but poorer stability to a warp knit with good stability, the properties of the resulting laminate may be improved.

Second fabric layer 20 is formed primarily of hydrophobic, microdenier yarns. By 'microdenier yarns' we mean yarns formed of microdenier fibers. In this example, each filament of the yarns is of about 1.0 denier. Fabric layer 20 is a circular knit material, of a basis weight of about 7.1 osy (241 gsm). It is preferable that the yarn used to make this fabric would be of very fine fibers in the near-microdenier or microdenier range, making it soft against the skin to improve comfort. It has been discovered that if fibers in these yarns also have irregular cross-sections, such as dogbone or cloverleaf, or are hollow, tiny spaces between or inside the fibers promote capillary action, helping to removing moisture from the skin. Hydrophobic polyester yarns are desirable because of their low moisture content, but Nylon fibers, in particular modified Nylon fibers, can also be used. Additionally, these fibers may be produced with silver compounds included in the polymer, for anti-microbial properties. By adding these compounds into the fiber, or by topical addition to the finished fabric, bacterial growth can be controlled to reduce infection and prevent odor. In one example the yarns are supplied by Hyosung of Korea, available under the brand name of Aerosilver®. Several yarns and filament counts are available under this brand name. In one example a 150-denier 144-filament yarn is selected. In this example second fabric layer 20 is a circular knit fabric, but warp knit fabrics may also be employed and may provide enhanced.

Brushing or napping of the skin contact surface 30 increases comfort and prevents dermal abrasion. Fibers 26 at the back surface of the knit (i.e., the side that will face the other material during lamination) are also raised by brushing or napping, discussed in more detail below, prior to lamination.

Napping the backside of one (or preferably, both) of fabric layers 12 and 20 prior to lamination increases the overall thickness of the resulting fabric, and can eliminate the need for a foam, such as Neoprene polychloroprene, or other inner core material found in tri-laminate fabrics. In one case, napping the lamination side of polyester second fabric layer 20 increased the thickness of fabric layer 20 from about 0.049 inch (1.24 mm) to about 0.083 inch (2.1 mm), or about a 70% increase in thickness—adding about 0.034 inch (0.9 mm) of napped fiber between the two fabric layers prior to adhesive lamination. Napping the lamination sides of both fabric layers, the resulting laminate had a thickness, after adhesion and compressive lamination, of about 0.122 inch (3.1 mm), or about a 150% increase over a thickness of a similar adhesive laminate formed without napping of the lamination sides of the fabric layers. Fabric thickness was measured in accordance with ASTM D1777 Section 7, Volume 7.01, with a thickness gauge modified for loop textiles with a two-inch (50 mm) diameter foot and a contact force of 31+/−3 grams, supplied by B C Ames Inc, of Melrose Mass., USA, as Model no ABD-2600N DIG IND, as per drawing number 07-0113. Overall fabric thickness for many applications, measured in this manner, is preferably between about 0.12 and 0.15 inch (3 and 4 mm).

Hot melt adhesive 22 was applied to the back side of second fabric layer 20 by a gravure printing process described more fully below. The adhesive is a co-polyamide resin available from EMS as Product 1566A. It has a very high melting point, higher than 300 degrees F. (150 C), to enable the laminate to be stable through washing cycles. Alternatively, a co-PA/PET resin may also be employed. The adhesive was applied as discrete dots, in a pattern resulting in an average distribution of 28 gsm of adhesive, such that the adhesive comprises only about six percent of the final laminate weight. This glue produces a good bond between two dissimilar surfaces. Other hot adhesives can be employed, such as polyamide, polyester or polypropylene. PUR (polyurethane reactive) adhesives can be used to give a good bond, but isocyanides exhausted in the reaction should be controlled to avoid health concerns.

Laminate 10, as formed, preferably has a basis weight of less than about 15 osy (508 gsm), or in a range of 13 to 15 osy (440 to 508 gsm), and a break strength of at least 75 lbf (333 N), without delamination, as measured in accordance with ASTM D5035 Section 7, Volume 7.02 in the machine direction of the fabric. One example had a basis weight of 13.5 osy (457 gsm) and a break strength of about 96 lbf (427 N), and at a test tension of 20 lbf (90 N) exhibited some plastic deformation but was still functional. Adhesive lamination bond strength can also be measured on an Instron tester in accordance with the ASTM D 2724-03 test method.

Laminate 10, as formed, preferably has an air permeability, measured in accordance with ASTM D737-04, of at least 60 cfm per square foot (18 meters/min), more preferably at least 100 cfm per square foot (30 meters/min). Air permeability may be measured on a Frazier Air Permeability Instrument, model FAP-HP, supplied by Frazier Precision Instruments Co Inc. of Hagerstown, Md., USA.

In an example of a disposable, three-part laminate (not illustrated), a nonwoven fabric core is laminated between a skin-friendly material of hydrophobic and antimicrobial properties, and a hook-engageable fabric. The non-woven core is first lightly needled to give it some structure and stability, but not to a point where air permeability is reduced. If insulating properties were preferred over permeability, needling could be increased. The non-woven fibers are selected to provide desired properties, such as anti-microbial, hypoallergenic, biocompatibility, or moldability properties. They are also preferably selected to promote wicking of moisture away from the skin. In addition, they may also be chemically treated to allow for molding the laminate to conform to a patient, by applying low to moderate heat. A lightweight, hook-engageable material is laminated to the opposite side of the non-woven core layer. The hook-engageable material may be a non-woven or lightweight knit, for example, and is preferably hydroscopic. The skin-side and hook-engageable outer fabrics may be attached to the non-woven by several different methods. One attachment method is to adhesively laminate the fabrics to the non-woven, such as with a hot melt adhesive, with the adhesive selected to bond the surfaces and to also be reformed with heat to conform to the shape of the patient. The adhesive can be applied by kiss coat or other method, but it may also be sprayed to minimize decreasing the fabric permeability.

Another example of a disposable laminate (also not illustrated) consists essentially of a non-woven, hook-engageable fabric layer adhesively laminated to a non-woven, skin-friendly fabric layer. The two layers are brushed or napped on the sides to face each other in the lamination, raising fibers from the non-woven surfaces and increasing overall lamination thickness. Hot melt adhesive is used for lamination, as in the illustrated example, with a majority of the lamination area adhesive-free for breathability.

In some cases the back surface of loop fabric 14 is coated to improve the anchoring of the loop fibers on the hook engageable side of the laminate. The back side of this fabric can be coated with a binder coat, for example, with a coating selected to be compatible with the lamination adhesive in order to prevent poor lamination adhesion. Some common back-coating liquids, such as acrylic and urethane binders, can interfere with the bonding of co-polyamide or co-polyester hot melt adhesives. Back coating fabrics using co-polyamide or co-polyester powders may be done in a scatter coat application, resulting in a compatible binder coat that does not dramatically reduce air permeability. In other cases, these powders can be dispersed in a paste and applied in convention coating methods.

Back-coating powders may be dispersed in an acrylic or urethane binder to provide deeper penetration into the fabric than a hot melt. The dispersed powders, because of their larger particle size, tend to filter out and remain on the outside surface of the fabric. In some cases powders are dispersed as one part powder to ten parts binder, and have been found to give an improved bond over straight acrylic or urethanes. The weight percentage of the powder can be increased to 50%, or even higher, to improve tie coat results. In some cases powder level can be increased high enough to provide bonding to other surfaces or fabrics when reheated (such as for lamination by iron) without a secondary application of bonding hot melt.

The back-coating dispersion may be first foamed and then applied by a foam coater. The amount of the dispersion applied can be controlled to increase or decrease the coat weight. Also, as mentioned above, the mix ratio can be altered to achieve the desired results of binding and tie coating. In some cases where light coating is required, flow rates as low as 0.5 liter/min are applied at a fabric speed of 28 yards/min. To achieve lower coat weights, the chemistry can be diluted as supplied, or blended with water in a foam mixer. In other cases, flow rates of up to 5.0 liters/min are applied at similar line speeds. In some cases the back-coating is applied at a flow rate of 1.2 to 1.6 liters per minute, while a flow rate of 2.6 liters per minute can provide more bonding.

In examples where loop fabric 12 is back-coated, it is generally only fabric 20 that is back-napped prior to lamination.

Figure 3:
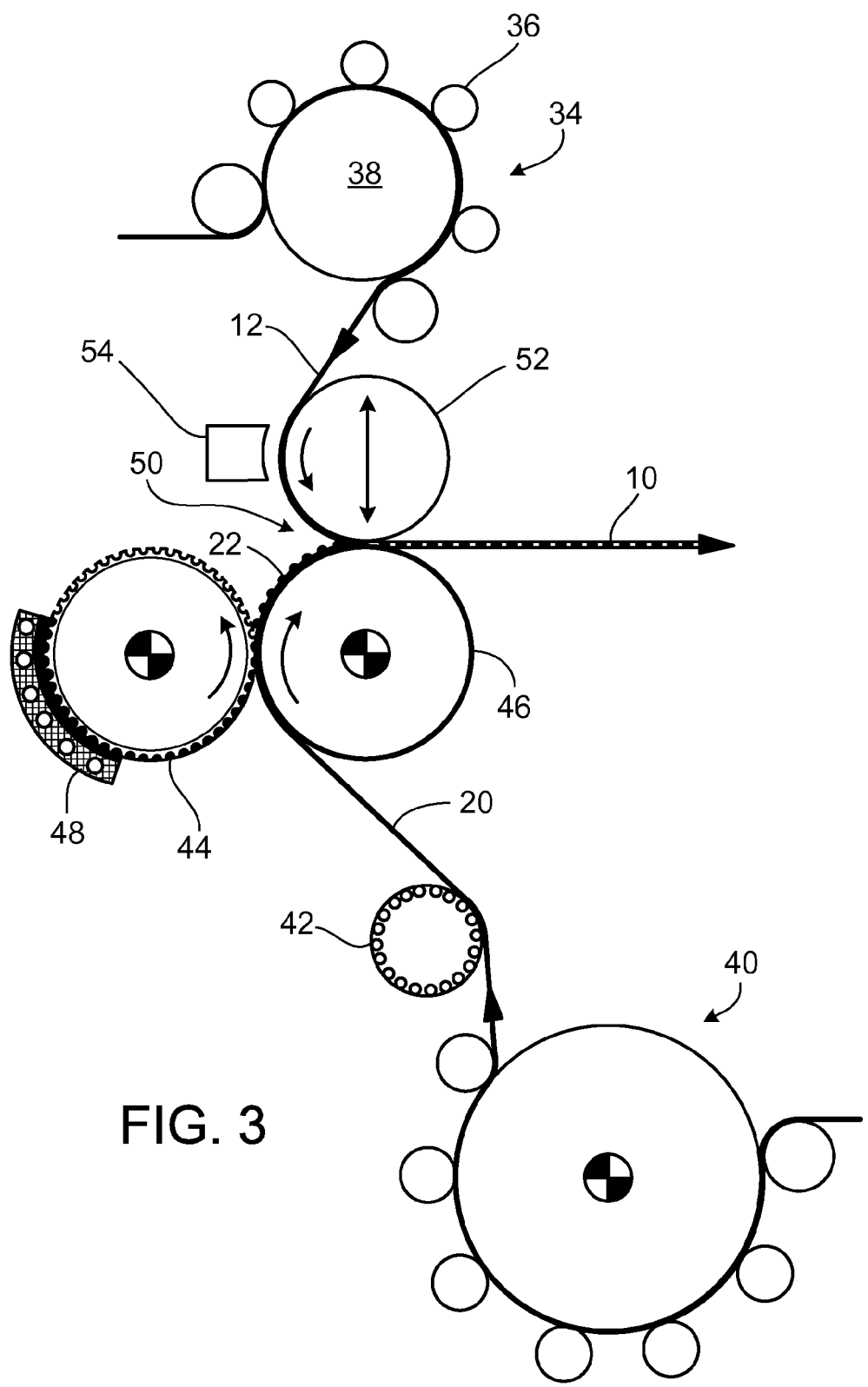
FIG. 3 is a schematic illustration of a machine and process for forming a fabric laminate material.

Referring next to FIG. 3, a method of forming a breathable fabric laminate from fabrics of differing properties includes selecting respective faces of each of two fibrous fabrics 12, 20 to be adhesively joined across the selected faces, raising surface fibers of at least one of the selected faces by brushing or napping the surface fibers, applying a pattern of adhesive to at least one of the selected faces, the pattern including areas of adhesive and adhesive-free areas, and then joining the selected faces to form a fabric laminate 10.

The pile surface of fabric layer 12 is preferably brushed or napped (not shown) to improve hook engagement. Additionally, the backside of fabric 12 is napped to increase laminate thickness, such as by passing fabric 12 through a carding station or napper 34 that contains one or more carding rollers 36 that carry napping wires, such as 28 to 32 gauge, elliptical cross-section wires ground to HSP points, that engage and nap the back side of fabric 12 as it passes around cylinder 38. Depending on the type of raising required, a number of different wire diameters, shapes, and bend angles can be used. The tips of these wires are also ground to varying degrees of sharpness or points to change the nap results. A typical napper 34 has between 20 and 36 individual rolls 36, each at least as wide as the width of the fabric to be napped. Each of these rolls 36 is mounted around the circumference of cylinder 38 and can be driven in the same or different directions, with the points of the wires pointed in the same or different directions. Varying the wire, roll and cylinder rotation changes the napper 38 between what are referred to as knit goods, single acting, and double acting configurations. By varying the speed of the roll rotation in electronic nappers, or torque in hydraulic flappers, varying levels of nap can be achieved. Commercial nappers are available from a number of suppliers.

Similarly, the back side of second fabric layer 20 is napped by passing through napper 40. The napped fabric then passes over an expander roller 42 on its way to the gravure roller 44. This illustrated method shows the back sides of both fabric layers being napped before lamination, although it will be understood that only one of the fabrics may be so napped. Also, the opposite faces of either or both fabrics may be brushed or napped for other purposes.

For gravure printing and laminating, second fabric layer 20 is trained about a rubber-coated pressure roller 46. Gravure roller 48 feeds adhesive 22 from a chambered doctor blade 48 onto the napped back of fabric 20 while on roller 46. Both fabrics 12, 20 are then fed into a lamination nip 50 defined between pressure roller 46 and laminating roller 52, where sufficient pressure is applied to form the laminate. Suitable lamination equipment may be obtained from Lacom Vertriebs GmbH Laminating Coating Machines of Lauchheim, Germany.

Gravure roller 44 has an outer surface that defines a pattern of offset or random cavities that each carry an associated, discrete volume of adhesive to the fabric surface. The pattern may comprise dots or lines, for example. With an offset or random dot pattern, adhesive dots are offset or random to distribute the bonding strength evenly. With a linear dot pattern the adhesive dots are arranged in lines, and in delaminating the products this can be felt as a bond-no bond force. The patterned adhesive application creates spaces between the adhesive dots for air to pass. Dot pattern, diameter, density, cavity depth, etc, all influence the percentage of coverage of adhesive on gravure roller 44 and in the final lamination 10. This can also be influenced by the use of a negative or positive blade position. Gravure rollers 44 are available to provide a coverage of 10 to 70 percent, and custom patterns are available. A CP 100 gravure roller with a coverage of approximately 37% has been found to result in a bond that is marginally acceptable, and a very good air permeability of about 125 cfm per square foot (37 meters/min). A CP 47 roll with a coverage of approximately 69% has been found to result in both a good bond and a good air permeability of about 100 cfm per square foot (30 meters/min).

It is possible to improve the adhesive bond while still obtaining a good permeability by changing the depth of the gravure dot cavities. A deeper dot holds more volume of adhesive, and creates a taller mound of adhesive to bridge the spacer layer between the two fabrics being laminated. Cavity depths of 0.06 mm to 0.50 mm are available. Depths of 0.18 mm to 0.25 mm have been shown to work.

Line speed and temperature are important factors to control the laminate bond strength, particularly with gravure rollers 44 that deposit less adhesive, such as a CP 100 or CP 96 gravure roller. Slower line speeds of approximately 5 yds/min (4.5 meters/min) or less can improve the bond with these lower-adhesive rollers. Using gravure rollers 44 that deposit more adhesive, bond strength is increased at higher speeds. Preferably lamination occurs while the adhesive is still somewhat flowable.

Adhesive lamination may also be improved by pre-heating the napped back side of first fabric layer 12 just prior to lamination, such as by an infrared heater 54, and/or by pre-heating the napped back side of second fabric layer 20, and/or by re-heating the exposed surfaces of the resin carried on the gravure roller before it enters the nip. Following lamination, the laminate 10 is directed to a tenter frame (not shown) in which the edges are trimmed, a slight cross-machine stretch of about 10 to 20 percent is applied to further improve permeability, and the material is stabilized by heating to 330 degrees F. (165 C) for about 30 seconds. The laminate is then spooled for transportation or further processing.

The adhesive may be applied by other means. For example, a web adhesive or apertured film, such as such as available from DelStar Technologies, Inc. of Middletown, Del., USA can be used. These webs can be formed by a random spray pattern, embossed from a film, or formed on a laminating machine with a gravure roll to form an open web, which can then be fed between the two fabrics into a heated belt laminator. In other cases breathable laminates can be formed by ultrasonically bonding multiple layers of fabric using little or no adhesive in the laminate. Beckmann Converting Inc. of Amsterdam, N.Y., USA is capable of doing such ultrasonic lamination. Another means is scatter or powder coating, in which a hot-melt resin is sprinkled on a moving web as a powder, heated to melt the resin, and then nipped with the other fabric to bond the web and fabric together to form the laminate. In some cases, when adhesive is applied by any method, such as gravure, powder, spray, or film, the two fabrics are compressed together under with light pressure with heat on a belt laminator, so as to provide bonding without crushing surfaces of sensitive fabrics.

Mechanical methods of securing the two fabrics together, as an alternative to, or in addition to, adhesive, include needling or stitch-bonding the two fabrics together. Ultrasonic heat staking is another bonding means, which can create a quilted surface.

In some cases the laminate is fashioned to have significant in-plane resilience or stretchiness, such as by including elastic fibers or yarns to both fabrics. Such fibers may be formed of a polyurethane polymer known as elastane, also available under the names Spandex or Lycra. Spandex is extruded as a monofilament in round or shaped cross-section, and is available as a multifilament with a denier as low as 15. Increasing the denier of the Spandex increases the "power" of elastic recovery. In some medical applications like elastic bandages, more power is desired to provide compression in the bandage. Flat rigid textile yarns can be used in combination with Spandex, but often it is preferred to use texturized yarns, because the added crimp in these yarns aids in the extension and recovery of the fabric. When used in fabrics made out of spun yarns, Spandex can be cut into staple and blended with other staple fibers, or the Spandex monofilament twisted together with other yarns.

Special precautions should be taken to prevent damage to the fabric when brushing or napping a fabric including elastic yarns of fibers. Brushing the pile side of the fabric is done routinely on stretch pile fabrics without damaging to stretch properties of the fabric. Care must be taken in back brushing, however, because the Spandex often lies close to, and in some cases on, the back surface of the fabric. In a brushing or napping operation, if the Spandex is contacted by the brush or napper wire, it can be cut or damaged. Then when the fabric is stretched, the Spandex may break and reduce the stretch properties of the fabric with repeated cycling.

One way to protect the Spandex during napping is to wrap the Spandex filament with nylon, polyester, cotton or other yarn. This is done in a yarn twisting or texturizing operation, where the textile yarn is twisted or texturized around the Spandex, usually with the Spandex under tension. These yarns are referred to as wrapped or covered yarns. This causes the Spandex to become the core of the resulting yarn. Such wrapped Spandex yarns may be knit into the fabric in a circular knitting operation, for example.

When this yarn is knit or woven into the back of the fabric, the cover around the Spandex fiber can keep the Spandex fiber from "grinning through" the outside of the garment. In a dyeing operation, Spandex typically does not dye to the same shade as the textile fabric, usually dyeing darker. If the Spandex is visible on the outside of the fabric, it can result in the pile face (technical back) being a different color than the fabric back (technical face). In swimwear or other stretch applications, this is objectionable to the consumer. In other cases, the Spandex may only appear some of the time on the fabric back, and other times the textile yarn is seen. This creates a non-uniform color appearance on the fabric back. In both of these cases, if the fabric is stretched, the Spandex becomes more visible.

When wrapped Spandex fabrics are back brushed, the textile fibers surrounding the core protect the Spandex, yet they can still be raised from the core, and in most cases the core is still hidden and undamaged.

Wrapped yarns are available in a variety of sizes. In weaving operations it is possible to use rather large denier wrapped yarns. In knit operations, the size of the yarn is selected to match the machine gauge and needle type. When knitting pile fabrics on circular knit machines having a gauge from 20-28 gauge, total yarn deniers from 40 to 300 denier are often used. In some cases a bare Spandex yarn of 10, 20 or 40 denier is wrapped or air covered (texturized) with yarns around 40 to 70 denier, making a total yarn denier of 50, 80, or 120 denier. Elastic recovery can be improved in the fabric by using a bare Spandex yarn of 70 denier, and covering with a yarn of 40-70 denier, making a total yarn denier of 120 to 150 denier. In other cases yarns of approximately 150 denier are used to cover Spandex of approximately 140 denier. Other combinations are possible.

Alternatively, bare Spandex yarn may be "laid into" the knit structure, so as to trap the Spandex between the ground and pile yarns and prevent the Spandex from appearing on the side of the fabric to be napped. In the lay in process, the bare Spandex is not knit into the fabric structure, and may afterward even be carefully pulled out of the fabric without distorting the fabric. In normal use the Spandex is not seen, and unless intentionally pulled, it can not be removed from the fabric. Stretch fabrics made in this manner generally have more cross machine stretch than machine direction stretch. These fabrics can also be back napped without damaging the Spandex. However, the yarn used in the back of the fabric must be large enough to displace the Spandex and to prevent it from rolling to the back surface. Also, the fabric construction must be tight enough to prevent exposing the Spandex. To prevent stretching the Spandex during knitting, the yarn packages must all be driven at the same speed. In commercial knitting, multiple packages of Spandex are fed into the machine at the same time. Stretchable loop fabrics may be back-coated to help anchor the loop fibers, as discussed above, but in such cases the back-coating should be selected to allow stretch. Elastic acrylic polymers may be used for such coatings, for example. The fabric may be heat set in a stretched condition, to further improve breathability.

The resulting laminate materials formed from either stretchable or non-stretchable fabrics may be fashioned into straps or linings or braces, for example. For use as a brace, repositionable rigid splint sections having male fastener elements that engage with the hook-engageable material of the laminate can be employed in place of fixed, sewn-in plastic and metal immobilizers.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of forming a breathable fabric laminate from fabrics of differing properties, the method comprising
    selecting respective faces of each of two fibrous fabrics to be adhesively joined across the selected faces;
    raising surface fibers of at least one of the selected faces by brushing or napping the surface fibers;
    applying a pattern of adhesive to at least one of the selected faces, the pattern including areas of adhesive and adhesive-free areas, the adhesive-free area including areas in which the fibers have been raised; and then
    joining the selected faces to form a fabric laminate in which the applied adhesive contacts both of the selected faces.

2. The method of claim 1, wherein raising the surface fibers comprises passing the fabric against a series of wire covered rolls.

3. The method of claim 1, wherein raising the surface fibers comprises increasing the fabric thickness by at least 70 percent.

4. The method of claim 1, wherein applying the pattern of adhesive comprises coating no more than about 70 percent of the selected face to which the adhesive is applied.

5. The method of claim 1, wherein the adhesive is applied to only one of the selected faces.

6. The method of claim 1, wherein the adhesive is applied as a pattern of unconnected adhesive regions.

7. The method of claim 6, wherein the adhesive regions are applied by a gravure roller defining cavities that hold respective amounts of adhesive that form individual adhesive regions, the cavities each having a depth of between about 0.18 and 0.25 millimeter.

8. The method of claim 6, wherein the adhesive regions each consist of an adhesive dot.

9. The method of claim 6, wherein the adhesive regions are in the form of parallel lines, or parallel lines of dots, of adhesive.

10. The method of claim 1, wherein applying the adhesive comprises training one of the fabrics about a compliant surface of a pressure roller, and engaging the selective face of the trained fabric with a gravure roller carrying the adhesive.

11. The method of claim 10, wherein joining the selected faces comprises
    carrying the trained fabric about the pressure roller into a lamination nip defined between the pressure roller and a laminating roller; while
    training the other of the two fabrics about the laminating roller and through the lamination nip.

12. The method of claim 1, wherein the adhesive is a hot melt adhesive.

13. The method of claim 1, further comprising heating at least one of the selected faces prior to joining the selected faces.

14. The method of claim 1, wherein joining the selected faces comprises passing the two fibrous fabrics through a nip between counter-rotating rollers, in which nip the two fabrics are subjected to laminating pressure.

15. The method of claim 1, wherein one of the two fibrous fabrics is an engageable fabric that carries hook-engageable fiber loops that remain exposed on an outer surface of the fabric laminate, and wherein raising surface fibers of the engageable fabric comprises brushing or napping a side of the engageable fabric opposite the fiber loops.

16. The method of claim 15, wherein the engageable fabric is a knit fabric.

17. The method of claim 15, wherein the engageable fabric comprises hydrophilic yarns.

18. The method of claim 15, wherein the other of the two fibrous fabrics comprises microdenier yarns and forms an exposed surface of the laminate opposite the fiber loops.

19. The method of claim 1, wherein at least one of the fabrics is a resiliently stretchable fabric containing elastane fibers.

* * * * *

UNITED STATES PATENT AND TRADEMARK OFFICE
CERTIFICATE OF CORRECTION

PATENT NO. : 8,679,285 B2  
APPLICATION NO. : 12/750887  
DATED : March 25, 2014  
INVENTOR(S) : Paul R. Erickson Page 1 of 1

It is certified that error appears in the above-identified patent and that said Letters Patent is hereby corrected as shown below:

Title Page Item 73 (Assignee) delete "Velero Industries B.V., Wallemstad, Curacao" and insert -- Velcro Industries B.V., Willemstad, Curacao --, In the Claims:

Col. 11, line 18, Claim 1, delete "adhesive-free area" and insert -- adhesive-free areas --.

Signed and Sealed this  
First Day of July, 2014

Michelle K. Lee  
*Deputy Director of the United States Patent and Trademark Office*